US011386676B2

United States Patent
Yi et al.

(10) Patent No.: US 11,386,676 B2
(45) Date of Patent: Jul. 12, 2022

(54) PASSENGER STATE ANALYSIS METHOD AND APPARATUS, VEHICLE, ELECTRONIC DEVICE AND STORAGE MEDIUM

(71) Applicant: SHANGHAI SENSETIME INTELLIGENT TECHNOLOGY CO., LTD., Shanghai (CN)

(72) Inventors: Chengming Yi, Shanghai (CN); Guanhua Liang, Shanghai (CN); Yang Wei, Shanghai (CN); Renbo Qin, Shanghai (CN); Chendi Yu, Shanghai (CN)

(73) Assignee: SHANGHAI SENSETIME INTELLIGENT TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 16/882,844

(22) Filed: May 26, 2020

(65) Prior Publication Data
US 2020/0285870 A1 Sep. 10, 2020

Related U.S. Application Data

(63) Continuation of application No. PCT/CN2019/111929, filed on Oct. 18, 2019.

(30) Foreign Application Priority Data

Oct. 19, 2018 (CN) .................. 201811224257.X (51) Int. Cl.
*G06K 9/00* (2022.01)
*G06V 20/59* (2022.01)
(Continued)

(52) U.S. Cl.
CPC ............ *G06V 20/593* (2022.01); *B60R 1/00* (2013.01); *B60W 50/14* (2013.01); *G06N 3/08* (2013.01);
(Continued)

(58) Field of Classification Search
CPC .......... G06K 9/00838; G06K 9/00268; G06K 9/00288; G06K 9/00369; G06K 9/00744;
(Continued)

(56) References Cited

U.S. PATENT DOCUMENTS

| 9,594,947 B1 * | 3/2017 | Kotagiri .............. G06K 9/6206 |
| 10,192,126 B2 | 1/2019 | Yamanaka et al. |

(Continued)

FOREIGN PATENT DOCUMENTS

| CN | 103978932 A | 8/2014 |
| CN | 106781285 A | 5/2017 |

(Continued)

OTHER PUBLICATIONS

International Search Report in the international application No. PCT/CN2019/111929, dated Jan. 21, 2020, 2 pgs.
(Continued)

*Primary Examiner* — Dhaval V Patel
(74) *Attorney, Agent, or Firm* — Cooper Legal Group, LLC (57) ABSTRACT

A passenger state analysis method and apparatus, a vehicle, an electronic device and a storage medium. The method includes: obtaining a video stream of a rear seat area in a vehicle; performing face and/or body detection on at least one image frame in the video stream; determining state information of a passenger in the rear seat area according to a face and/or body detection result; and in response to the fact that the state information of the passenger satisfies a predetermined condition, outputting prompt information to a driver area or a specified device in the vehicle.

17 Claims, 4 Drawing Sheets

(51) Int. Cl.
- *B60R 1/00* (2022.01)
- *B60W 50/14* (2020.01)
- *G06N 3/08* (2006.01)
- *G06V 20/40* (2022.01)
- *G06V 40/10* (2022.01)
- *G06V 40/16* (2022.01)

(52) U.S. Cl.
CPC ............ *G06V 20/46* (2022.01); *G06V 40/103* (2022.01); *G06V 40/168* (2022.01); *G06V 40/172* (2022.01); *B60R 2300/8013* (2013.01); *G06V 40/178* (2022.01)

(58) Field of Classification Search
CPC ..... G06K 2009/00322; G06K 9/00228; G06K 9/00342; G06K 9/00832; G06K 9/6274; G06K 9/00362; B60R 1/00; B60R 2300/8013; B60W 50/14; B60W 2540/01; G06N 3/08; G06N 3/0454; G06N 3/02
See application file for complete search history.

(56) References Cited

U.S. PATENT DOCUMENTS

| | | | |
|---|---|---|---|
| 2014/0093133 A1 | 4/2014 | Frank et al. | |
| 2014/0310271 A1* | 10/2014 | Song | H04N 21/4668 707/732 |
| 2015/0105976 A1 | 4/2015 | Shikii et al. | |
| 2016/0379466 A1 | 12/2016 | Payant et al. | |
| 2017/0054949 A1* | 2/2017 | Shaw | G02B 27/0101 |
| 2017/0351928 A1 | 12/2017 | Yamanaka et al. | |
| 2019/0061761 A1* | 2/2019 | Tsuchiya | G05D 1/021 |
| 2019/0391581 A1* | 12/2019 | Vardaro | A61B 5/18 |

FOREIGN PATENT DOCUMENTS

| | | |
|---|---|---|
| CN | 106985750 A | 7/2017 |
| CN | 107341438 A | 11/2017 |
| CN | 107451524 A | 12/2017 |
| JP | 2015067254 A | 4/2015 |
| JP | 2016030478 A | 3/2016 |
| JP | 2017007548 A | 1/2017 |
| KR | 20160078154 A | 7/2016 |
| KR | 20180093632 A | 8/2018 |
| WO | 2017040929 A1 | 3/2017 |
| WO | 2017098265 A1 | 6/2017 |

OTHER PUBLICATIONS

Written Opinion of the Singaporean application No. 11202004942R, dated May 19, 2021, 9 pgs.

English translation of the Written Opinion of the International Search Authority in the international application No. PCT/CN2019/111929, dated Jan. 21, 2020, 4 pgs.

First Office Action of the Korean application No. 10-2020-7014873, dated Oct. 25, 2021, 16 pgs.

Notice of Rejection of the Japanese application No. 2020-528320, dated Mar. 1, 2022, 4 pgs.

* cited by examiner

PASSENGER STATE ANALYSIS METHOD AND APPARATUS, VEHICLE, ELECTRONIC DEVICE AND STORAGE MEDIUM

CROSS-REFERENCE TO RELATED APPLICATION

The present disclosure is a U.S. continuation application of International Application No. PCT/CN2019/111929, filed on Oct. 18, 2019, which claims priority to Chinese Patent Application No. CN201811224257.X, filed with the Chinese Patent Office on Oct. 19, 2018, and entitled "PASSENGER STATE ANALYSIS METHOD AND APPARATUS, VEHICLE, ELECTRONIC DEVICE AND STORAGE MEDIUM". The disclosures of International Application No. PCT/CN2019/111929 and Chinese Patent Application No. CN201811224257.X are incorporated herein by reference in their entireties.

BACKGROUND

In real life, when driving a vehicle, a driver's driving state is an important factor affecting driving safety issues. In order to ensure driving safety during driving, it is necessary to monitor the driving state of the driver, and coordinately control the driving state of the vehicle according to the monitoring results.

SUMMARY

The present disclosure relates to the computer vision technology, and in particular, to a passenger state analysis method and apparatus, a vehicle, an electronic device and a storage medium.

Embodiments of the present disclosure provide technical solutions for passenger state analysis.

According to one aspect of the embodiments of the present disclosure, provided is a passenger state analysis method, including:

obtaining a video stream of a rear seat area in a vehicle;

performing at least one of face detection or body detection on at least one image frame in the video stream;

determining state information of a passenger in the rear seat area according to a result of the at least one of face detection or body detection; and in response to the fact that the state information of the passenger satisfies a predetermined condition, outputting prompt information to a driver area or a specified device in the vehicle.

According to another aspect of the embodiments of the present disclosure, provided is a passenger state analysis apparatus, including:

a video collection unit, configured to obtain a video stream of a rear seat area in a vehicle;

an image detection unit, configured to perform at least one of face detection or body detection on at least one image frame in the video stream;

a state determining unit, configured to determine state information of a passenger in the rear seat area according to a result of the at least one of face detection or body detection; and an information prompt unit, configured to: in response to the fact that the state information of the passenger satisfies a predetermined condition, output prompt information to a driver area or a specified device in the vehicle.

According to still another aspect of the embodiments of the present disclosure, provided is a vehicle, including the passenger state analysis apparatus according to any one of the embodiments above.

According to yet another aspect of the embodiments of the present disclosure, provided is an electronic device, including a processor, where the processor includes the passenger state analysis apparatus according to any one of the embodiments above.

According to still another aspect of the embodiments of the present disclosure, provided is an electronic device, including a memory, configured to store executable instructions; and a processor, configured to communicate with the memory to execute the executable instructions so as to complete operations of the passenger state analysis method according to any one of the embodiments above.

According to still another aspect of the embodiments of the present disclosure, provided is a computer-readable storage medium, configured to store computer-readable instructions, where when the instructions are executed, operations of the passenger state analysis method according to any one of the embodiments above.

According to yet another aspect of the embodiments of the present disclosure, provided is a computer program product, including computer-readable codes, where when the computer-readable codes are run on a device, a processor in the device executes instructions for implementing the passenger state analysis method according to any one of the embodiments above.

Based on the passenger state analysis method and apparatus, the vehicle, the electronic device and the storage medium provided in the embodiments of the present disclosure, a video stream of a rear seat area in a vehicle is obtained; at least one of face detection or body detection is performed on at least one image frame in the video stream; state information of a passenger in the rear seat area is determined according to a result of the at least one of face detection or body detection; and in response to the fact that the state information of the passenger satisfies a predetermined condition, prompt information is output to a driver area or a specified device in the vehicle. By analyzing the state of passengers and combining prompt information, the occurrence of accidents is reduced, and the safety and comfort of passengers are improved.

The technical solutions of the present disclosure are further described below in detail with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the descriptions.

According to the following detailed description, the present disclosure may be understood more clearly with reference to the accompanying drawings.

DETAILED DESCRIPTION

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, vehicle-mounted devices, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

Figure 1:
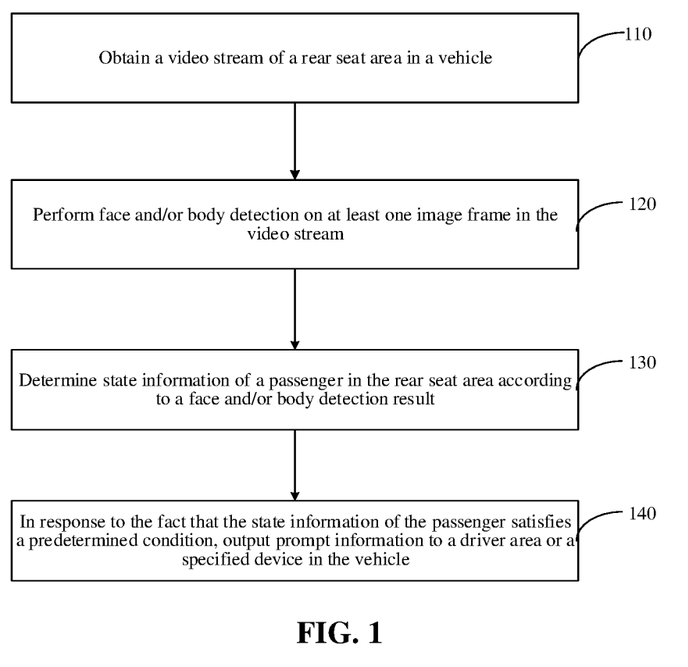
FIG. 1 is a schematic flowchart of a passenger state analysis method according to embodiments of the present disclosure.

FIG. 1 is a schematic flowchart of a passenger state analysis method according to embodiments of the present disclosure. The method may be performed by any electronic device, such as a terminal device, a server, a mobile device, and a vehicle-mounted device, which is not limited in the embodiments of the present disclosure. As shown in FIG. 1, the method of the embodiments includes the following operations.

At operation 110, a video stream of a rear seat area in a vehicle is obtained.

The vehicles in the embodiments of the present disclosure may include various types of passenger vehicles, such as small cars, small passenger cars, and large passenger cars. In addition to the driver, these vehicles may include at least one passenger. The passenger in the embodiments refers to a person located in a non-driver's seat area in the compartment. The position of the passenger is significantly distinguished from the position of the driver. In the embodiments of the present disclosure, the passenger seat area is called a rear seat area, that is, the seat area behind the driving area in the compartment is called the rear seat area, which is not necessarily the last row and may be the middle row. The rear seat area is collected to obtain a video stream including passengers, so as to realize the state analysis of the passengers in the vehicle.

In one optional example, operation S110 may be performed by a processor by invoking a corresponding instruction stored in a memory, or may be performed by a video collection unit 71 run by the processor.

At operation 120, face and/or body detection is performed on at least one image frame in the video stream.

Optionally, the state of the passenger in the vehicle includes not only a state determined by facial expressions, but also a state determined based on a body movement. Therefore, in the embodiments of the present disclosure, the analysis of the passenger state is implemented by performing detection on a face and/or body, thereby improving the accuracy of passenger state detection and reducing accidents caused by state missing detection. For example, the passenger's face is in a normal state and his hand is extended out of the window. In this case, if only face detection is performed, an alarm for dangerous actions is missed. For another example, when the passenger's body is not moving, vomiting or pain appears on the face. In this case, if only body detection is performed, an alarm of the passenger's abnormal state is missed. Therefore, the embodiments of the present disclosure detect the face and/or body, specifically the detection of the face, the body, or both the face and the body is determined according to which part of the obtained passenger image includes the abnormal content. Optionally, the neural network in the embodiments of the present disclosure may be a multi-layer neural network (i.e., a deep neural network), where the neural network may be a multi-layer convolutional neural network, such as LeNet, AlexNet, GoogLeNet, VGG, ResNet and other arbitrary neural network models. Each neural network may adopt a neural network of the same type and structure, or a neural network of a different type and/or structure. The embodiments of the present disclosure do not limit the network.

Optionally, face and/or body detection is implemented by one or two trained neural networks, to obtain a passenger face and/or body detection result. The embodiments of the present disclosure do not limit the specific detection process.

In one optional example, operation 120 may be performed by a processor by invoking a corresponding instruction stored in a memory, or may be performed by an image detection unit 72 run by the processor.

At operation 130, state information of a passenger in the rear seat area is determined according to a face and/or body detection result.

In one or more optional embodiments, the state information of the passenger is obtained by analyzing or collecting statistics about the face and/or body detection result. For example, statistics is performed on the eyes closed time in the detection result. When the eyes closed time reaches the set time, or the ratio of the cumulative time with eyes closed to the statistical time window exceeds a set threshold, the passenger's state is considered to be a sleeping state.

In one optional example, operation 130 may be executed by a processor by invoking a corresponding instruction stored in a memory, or may be executed by a state determining unit 73 run by the processor.

At operation 140, in response to the fact that the state information of the passenger satisfies a predetermined condition, prompt information is output to a driver area or a specified device in the vehicle.

Optionally, the prompt information may include, but is not limited to, at least one of forms: sound prompt information (such as alarm sound and voice prompt), vibration prompt information (such as control of driver seat vibration, and control of other device vibrations), display prompt information (such as displaying image frames related to the prompt content in the video stream, and displaying text or character prompt information), odor prompt information (such as sending irritating odor to the driver), etc. The above prompt information is used alone or in combination to increase the probability that the recipient may accurately and promptly receive the prompt information.

Optionally, in order to improve the real-time safety of passengers, a display device is provided in the driver's line of sight range in the driver area of the vehicle, so that the driver obtains prompt information in real time and process the passenger state in time to improve the passenger's safety.

In one optional example, operation 140 may be executed by a processor by invoking a corresponding instruction stored in a memory, or may be executed by an information prompt unit 74 run by the processor.

Based on the passenger state analysis method provided in the embodiments of the present disclosure, a video stream of a rear seat area in a vehicle is obtained; face and/or body detection is performed on at least one image frame in the video stream; state information of a passenger in the rear seat area is determined according to a face and/or body detection result; and in response to the fact that the state information of the passenger satisfies a predetermined condition, prompt information is output to a driver area or a specified device in the vehicle. By analyzing the state of passengers and combining prompt information, the occurrence of accidents is reduced, and the safety and comfort of passengers are improved. Because the rear seat area is outside the driver's line of sight range, the state analysis of the person in this area may promptly inform the driver of the effective information or the information that the driver cares about, so that the driver concentrates on driving under normal circumstances to reduce distracted driving factors and improve driving safety. In addition, abnormal information or information that the driver is concerned about may be found in time, so that the driver takes timely measures to improve the user experience.

Figure 2:
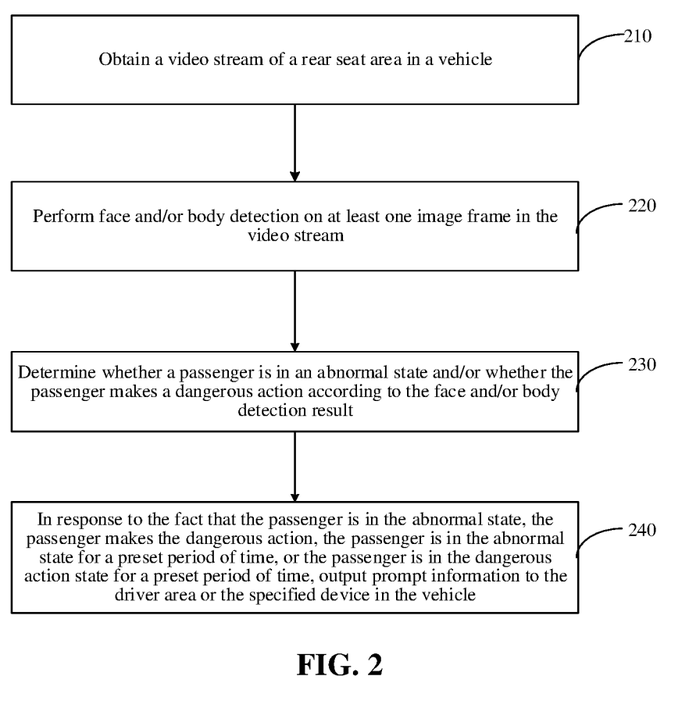
FIG. 2 is another schematic flowchart of a passenger state analysis method according to embodiments of the present disclosure.

FIG. 2 is another schematic flowchart of a passenger state analysis method according to embodiments of the present disclosure. As shown in FIG. 2, the method of the embodiments includes the following operations.

At operation 210, a video stream of a rear seat area in a vehicle is obtained.

At operation 220, face and/or body detection is performed on at least one image frame in the video stream.

Operations 210 and 220 in the embodiments of the present disclosure are similar to operations 110 and 120 in the foregoing embodiment, and may be understood with reference to the foregoing embodiment, and details are not described herein again.

At operation 230, whether the passenger is in an abnormal state and/or whether the passenger makes a dangerous action is determined according to the face and/or body detection result.

In the embodiments of the present disclosure, the passenger is in an abnormal state and/or makes a dangerous action, which may threaten the safety of the passenger or the safety of the vehicle. In this case, if the state of the passenger is processed in time, serious consequences may be caused.

In one or more optional embodiments, the abnormal state may include, but is not limited to, at least one of: irritability, vomiting, choking, coughing, pain, crying, falling asleep, or waking up.

Optionally, since the abnormal state cannot usually be determined based on the detection result of only one image frame, in order to determine whether the passenger is in an abnormal state, statistics or analysis may be performed on the face and/or body detection result. For example, statistics is performed on the eye-closed time in the detection result. When the eye-closed time reaches the set time, the passenger's state is considered as a sleep state, or it is implemented based on a trained classification neural network. Based on the trained classification neural network, a classification result about whether it is in an abnormal state is directly obtained based on the face and/or body detection result. The embodiments of the present disclosure do not limit the specific means for obtaining whether the passenger is in an abnormal state.

Optionally, the child is a special passenger, because the child's state is unstable, and an accidental state is likely to occur due to external interference. Moreover, if the passenger is a child, the state of the child may affect the state of the driver. For example, if the child is crying, the driver may be distracted and cannot drive safely, or the child moving around in the seat and the driver not finding it in time may cause the child to be in danger.

In one or more optional embodiments, the dangerous action may include, but is not limited to, at least one of: opening a door, holding a device, unfastening a seat belt, extending a part of a body out of a window, leaving a specified area, or smoking, etc.

Optionally, during the driving of the vehicle, if a passenger makes actions that threaten the safety of himself/herself or other passengers and the driver, it is considered that the passenger makes dangerous actions. When these dangerous actions occur, the driver or other passengers or other relevant personnel needs to stop in time to prevent accidents. For example, in a vehicle equipped with a no-smoking device, smoking may trigger the no-smoking device (such as a smoke alarm). Determining whether a passenger makes dangerous actions may perform statistics or analysis on the face and/or body detection results. For example, statistics is performed on the hand at the door switch in the detection result. When the time for the hand at the door switch reaches the set time, it is considered that the passenger makes a dangerous action of driving the door, or it is implemented based on a trained classification neural network. Based on the trained classification neural network, the classification result of whether the passenger makes a dangerous action is directly obtained based on the face and/or body detection results. The embodiments of the present disclosure do not limit the specific means of obtaining whether the passenger makes dangerous actions.

Optionally, due to the particularity of the child, leaving the specified area in the abnormal state of the child may be leaving the child seat. When the child leaves the child seat, the child's riding safety is not guaranteed. The child seat may provide the child with riding safety. According to the national standard "Restraining Devices for Child Occupants of Power-Driven Vehicles", the child needs to be seated in the child seat while riding. Moreover, adults leaving designated areas (such as fixed seats on coaches) and standing or going to other seats may harm the interests of other passengers, it is also necessary to stop them in time.

At operation 240, in response to the fact that the passenger is in the abnormal state, the passenger makes the dangerous action, the passenger is in the abnormal state for a preset period of time, or the passenger is in the dangerous action state for a preset period of time, the prompt information is output to the driver area or the specified device in the vehicle.

In the embodiments of the present disclosure, different abnormal states and dangerous actions of passengers have different urgencies. Once some abnormal states and dangerous actions occur, it needs to deal with immediately, otherwise more serious consequences may occur. For example, the passenger is in a choking state, if it is not handled in time, the life safety of the passenger is endangered, and thus it needs to be handled in time, or the passenger extends a part of the body out of the window, the vehicle may be staggered with other vehicles at any time in motion, causing danger to the passenger, and thus the dangerous action of the passenger needs to be stopped in time. Moreover, some abnormal states and dangerous actions are not urgent, and thus may be handled after a certain period of time. For example, the passenger is coughing, which may be caused by illness or other reasons, the short-term cough may be a normal behavior or chronic disease of the passenger, the intervention of the handler may not produce obvious effects, and the risk is low. Only when the duration of the cough reaches the set time, it is indicated that it is a special case and the handler needs to intervene properly to ensure the safety of passengers. More special, when the passenger is a child, the urgency of a child is higher than that of an adult. The handler may sequentially deal with multiple states that appear at the same time according to different urgencies, without being busy and making mistakes because of too many prompts at the same time. For example, passengers with parts of their bodies out of the window and passengers who are coughing, prompt information is first sent for the passengers with parts of their bodies out of the window, and then prompt information is sent when the cough continues for a preset time.

In one or more optional embodiments, the passenger includes at least one of: an adult or a child.

That is, the passenger is a child or an adult. The child in the embodiments of the present disclosure may include, but is not limited to, children, infants, and young children, etc. To determine whether the person in the image is a child, a person who is generally regarded as a child visually by the public is determined as a child, or a person below the reference age or the custom age may be determined as a child. For example, the reference age may be the age of a child required by law (such as 12), or the custom age may be set to 3, 6, or 8 years old, etc. The embodiments of the present disclosure do not limit the specific age of children. Different age groups are customized as children according to the specific circumstances. For example, children under 6 years old in a kindergarten are defined as children, and children under 12 years old when riding a bus are defined as children. Adults may include, but are not limited to, minors who do not belong to children and adults. The adults are divided into various types according to age, such as youngster, young people, middle-aged people, and the elderly.

The passengers in the embodiments of the present disclosure may be passengers in a general sense, or people who need special attention, such as the elderly, patients, pregnant women, the disabled, people with reduced mobility. The passenger and the driver may have a specific relationship, such as a family member relationship, or may not have a specific relationship, for example, as a driver and passengers on a vehicle on a public transport.

In one or more optional embodiments, the face and/or body detection result includes at least one of: whether there is a face, whether there is a body, eyes open, eyes closed, expression, age, mouth open, mouth closed, or body movements.

The state of the passenger is determined by the face and/or body detection results. Therefore, the face and/or body detection results in the embodiments of the present disclosure are detection results related to the state of the person, and the state of the person is determined based on at least one detection result. For example, whether the passenger is asleep is determined based on the eyes closed state, whether the passenger is awake is determined based on the eyes closed and open states, and whether the passenger leaves a specified area is determined based on whether there is a body or a face in the specified area.

Figure 3:
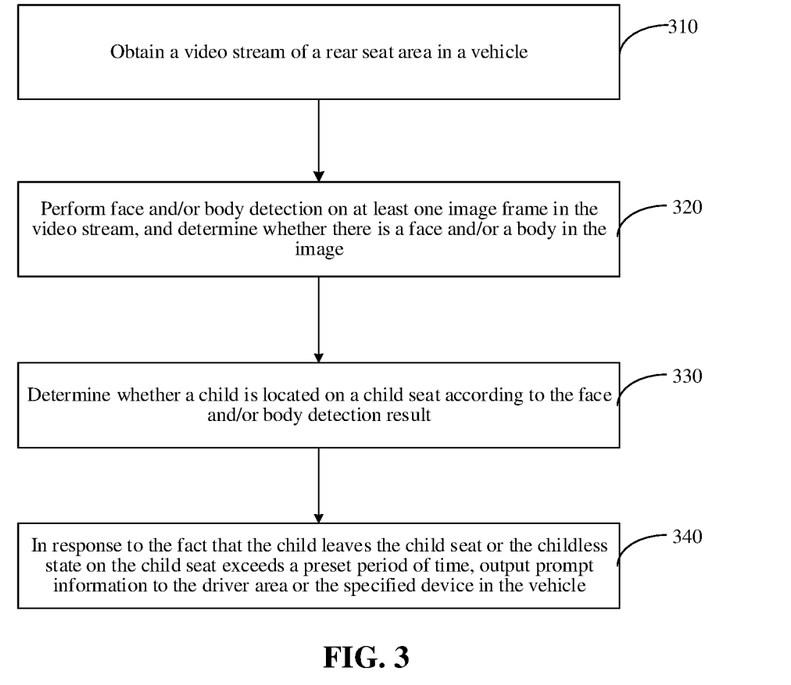
FIG. 3 is a schematic flowchart of one optional example of the passenger state analysis method according to embodiments of the present disclosure.

FIG. 3 is a schematic flowchart of one optional example of the passenger state analysis method according to embodiments of the present disclosure. In the optional examples, the passenger includes the child, and the rear seat area includes a child seat area. As shown in FIG. 3, the method of the embodiments includes the following operations.

At operation 310, a video stream of a rear seat area in a vehicle is obtained.

At operation 320, face and/or body detection is performed on at least one image frame in the video stream, and whether there is a face and/or a body in the image is determined.

Operations 310 and 320 in the embodiments of the present disclosure are similar to operations 110 and 120 in the foregoing embodiment, and may be understood with reference to the foregoing embodiment, and details are not described herein again.

Operation 320 merely differs from operation 120 in that: the obtained detection result includes at least one of whether there is a face, or whether there is a body. The state for one situation of the child is obtained by limiting the detection result, to improve the processing efficiency for the state of the child.

At operation 330, whether the child is located on a child seat is determined according to the face and/or body detection result.

Optionally, whether the child is located on the child seat is determined according to whether there is a face and/or a body in the child seat area. In particular, when the child is located on the child seat, the body of the child may be shielded by other objects (such as a quilt and a blanket). Therefore, when the body is shielded, it may be selected to determine whether the child is on the child seat by the presence or absence of a face, or determine whether the child is on the child seat by the presence or absence of a face or a body, to improve the accuracy of the detection results.

At operation 340, in response to the fact that the child leaves the child seat or the childless state on the child seat exceeds a preset period of time, prompt information is output to the driver area or the specified device in the vehicle.

In order to improve the safety of children, the child seat is usually fixed on the vehicle seat. After the child seat is fixed, the position of the child seat is determined. The child leaves the child seat or the childless state on the child seat exceeds a preset period of time, it is indicated that the child does not sit on the child seat, it is very dangerous for a child not to sit on the child seat when the vehicle is traveling, and it is necessary to arrange the child according to the prompt information provided in the embodiments of the present disclosure to improve the riding safety of the child.

Figure 4:
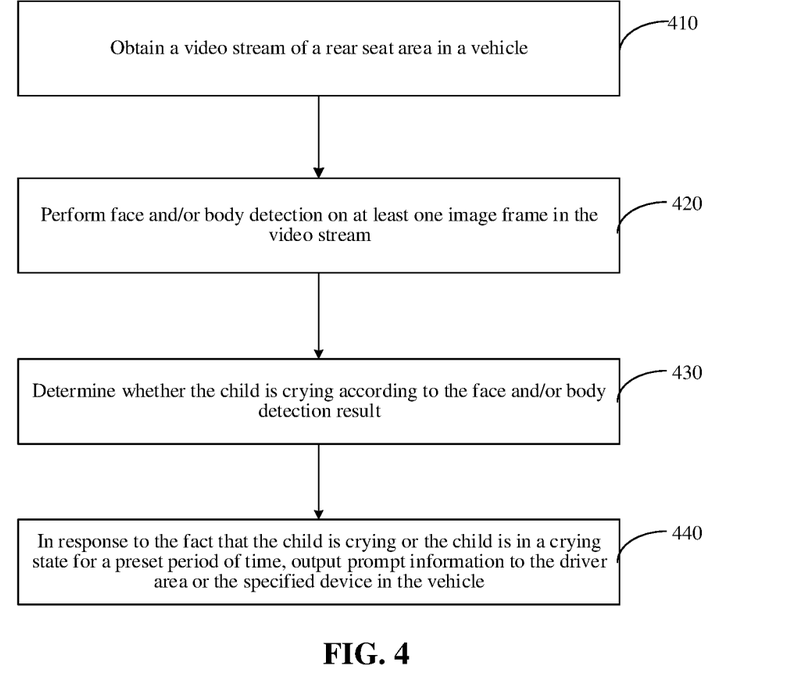
FIG. 4 is a schematic flowchart of another optional example of the passenger state analysis method according to embodiments of the present disclosure.

FIG. 4 is a schematic flowchart of another optional example of the passenger state analysis method according to embodiments of the present disclosure. In the optional examples, the passenger includes the child. As shown in FIG. 4, the method of the embodiments includes the following operations.

At operation 410, a video stream of a rear seat area in a vehicle is obtained.

At operation 420, face and/or body detection is performed on at least one image frame in the video stream.

Operations 410 and 420 in the embodiments of the present disclosure are similar to operations 110 and 120 in the foregoing embodiment, and may be understood with reference to the foregoing embodiment, and details are not described herein again.

At operation 430, whether the child is crying is determined according to the face and/or body detection result.

In the embodiments, determining whether the child is in a crying state may be implemented by a trained neural network, or whether the child is crying is determined in other ways. The embodiments of the present disclosure do not limit the specific means for determining whether the child is crying. For example, whether the child is crying is determined by using a trained classification network. The classification network may include two categories (crying and non-crying). The classification network may directly process the face image, and may also process the face features corresponding to the face image. The face features are obtained from the face image by feature extraction.

At operation 440, in response to the fact that the child is crying or the child is in a crying state for a preset period of time, prompt information is output to the driver area or the specified device in the vehicle.

Because the child's emotional and physical conditions are unstable and may change at any time, when the child is in different states, reasonable operations are required to reduce the discomfort of the child or affect the driving safety. For example, when the child is in a crying state, it is needed to handle in time (e.g., pacifying the child in time, etc.) to reduce the abnormal state to harm the child.

Figure 5:
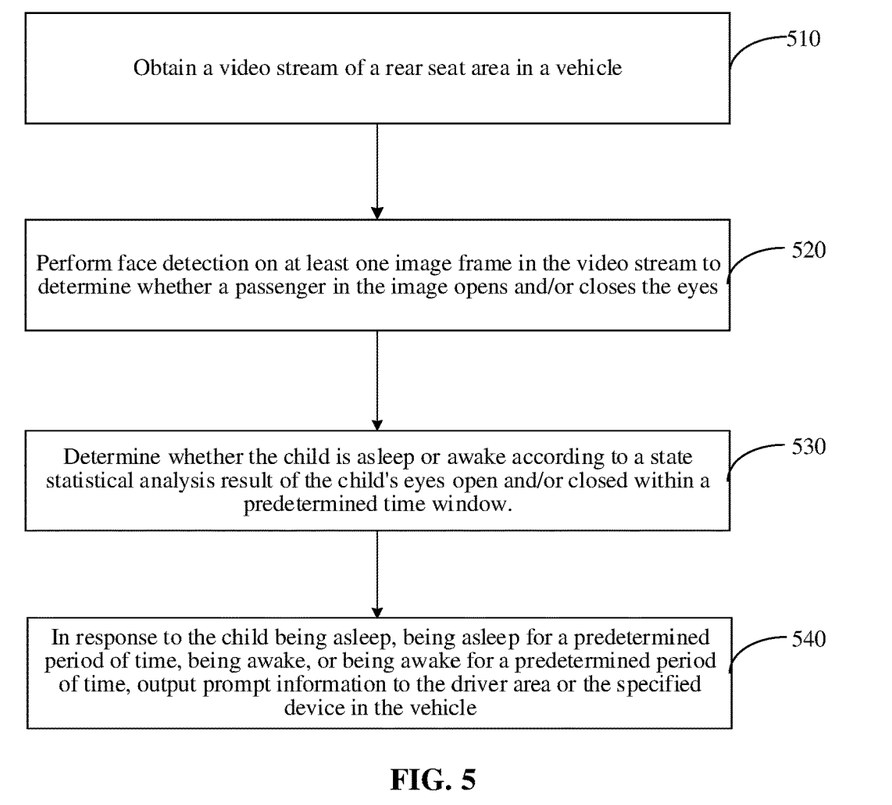
FIG. 5 is a schematic flowchart of still another optional example of the passenger state analysis method according to embodiments of the present disclosure.

FIG. 5 is a schematic flowchart of still another optional example of the passenger state analysis method according to embodiments of the present disclosure. In the optional examples, the passenger includes the child. As shown in FIG. 5, the method of the embodiments includes the following operations.

At operation 510, a video stream of a rear seat area in a vehicle is obtained.

Operation 510 in the embodiments of the present disclosure is similar to operation 110 in the foregoing embodiment, and may be understood with reference to the foregoing embodiment, and details are not described herein again.

At operation 520, face detection is performed on at least one image frame in the video stream to determine whether the passenger in the image opens and/or closes the eyes.

Optionally, because the eyes are on the face, in order to determine the eyes open and/or closed state of the passenger, the embodiments of the present disclosure only need to perform face detection on the image to determine whether the passenger opens and/or closes the eyes. The passenger's eye state for the video stream is determined based on the eyes open and/or closed state in at least one image frame.

At operation 530, whether the child is asleep or awake is determined according to a state statistical analysis result of the child's eyes open and/or closed within a predetermined time window.

Optionally, the child's eye state generally includes only two states, i.e., eyes open and eyes closed. When the eyes closed state continues for a set period of time, it is considered that the child is asleep. Since the embodiments of the present disclosure analyze the state of the child by the video stream, the statistics is performed on the child's eyes open or closed state based on the continuous frames in the video stream, so as to determine the duration of the child's eyes open or closed. Moreover, it is considered that the child is awake if the state changes from the state of continuously closing the eyes to the state of opening the eyes, or from the state of closing the eyes to the state of closing the eyes multiple times.

At operation 540, in response to the child being asleep, being asleep for a predetermined period of time, being awake, or being awake for a predetermined period of time, the prompt information is output to the driver area or the specified device in the vehicle.

The state that the child is asleep or awake is a low-urgency situation. Prompt information may be sent promptly, or the prompt information may be sent when the child is asleep for a predetermined period of time, and the child is awake for a predetermined period of time, where the predetermined period of time corresponding to the asleep state and the predetermined period of time corresponding to the awake state may be the same or different.

In one or more optional embodiments, the face and/or body detection result includes: a classification result of whether the passenger is a child.

Operation 120 includes:

extracting a face and/or body feature of at least one image frame in the video stream; and performing classification processing of whether the passenger is a child based on the extracted feature.

Optionally, because children belong to a special group, for example, the child needs to seat in a child seat when riding a car, when the passenger state is analyzed, the passengers are classified into children and non-children, and non-children are regarded as adults. In order to determine whether it is a child, the result of whether it is a child may be output based on the trained classification network, or the passenger's age may be identified based on the trained neural network. When the passenger's age is less than or equal to the preset age, it is determined that the passenger is a child. When the passenger's age is greater than the preset age, it is determined that the passenger is a non-child. In the embodiments, the preset age may be set according to actual situations, and multiple preset ages may be set as needed, so that the ages of children are divided into multiple different age groups. For example, on a kindergarten school bus, children under 7 years old may be divided into at least two age groups, such as: 0-3 years old and over 3 years old. In addition to the child seats, children aged 0-3 require adult supervision. Children aged 3-7 are more active, and their seat positions need to be monitored. In this case, the preset age may include a first preset age and a second preset age. The first preset age is 3 years old, and the second preset age is 7 years old.

In one or more optional embodiments, operation 120 includes: performing, by a feature extraction branch of a neural network, face feature extraction and/or body feature extraction on the at least one image frame in the video stream; and determining, by at least one detection branch connected to the feature extraction branch in the neural network, the face and/or body detection result based on a face feature and/or a body feature extracted by the feature extraction branch.

In the embodiments of the present disclosure, face detection and body detection may be implemented by different detection branches, respectively. That is, the face detection result is obtained by one detection branch, the body detection result is obtained by another detection branch, and the face and body detection results are obtained by connecting at least one detection branch to the feature extraction branch to share the feature obtained by the feature extraction branch, which speeds up the detection process and saves detection time.

In one or more optional embodiments, operation 120 includes: performing, by the feature extraction branch of the neural network, face feature extraction and/or body feature extraction on the at least one image frame in the video stream; and respectively determining, by a classification branch and at least one detection branch connected to the feature extraction branch in the neural network, whether a person in the image is a child, and the face and/or body detection result based on the face feature and/or the body feature extracted by the feature extraction branch.

In the embodiments of the present disclosure, the operation of determining whether the passenger is a child is added. Optionally, in the embodiments, the classification results (two classification results) of whether the passenger is a child are determined by inputting face features into the classification branch, i.e., determining that the passenger is a child or not a child. Sharing the face features and/or body features to determine whether the passenger is a child and the face and/or body detection result is merely one feature extraction process, which improves the detection and classification efficiency.

In one or more optional embodiments, operation 120 includes: performing, by the feature extraction branch of the neural network, face feature extraction on the at least one image frame in the video stream;

determining, by the classification branch connected to the feature extraction branch in the neural network, whether the person in the image is a child based on the face feature extracted by the feature extraction branch; or determining, by an identification branch connected to the feature extraction branch in the neural network, the age of the passenger in the image, and determining the passenger whose age is less than or equal to a preset age as a child.

In the embodiments of the present disclosure, one neural network is individually provided to determine whether the passenger is a child. Optionally, the classification result of whether the passenger is a child is determined by one classification branch based on the face feature, or the passenger's age is determined by the recognition branch based on the face feature, and the passenger with the age less than or equal to the preset age is determined as a child.

Optionally, the classification branch that determines whether the person in the image is a child is pre-trained based on child annotation data that distinguishes gender.

In the embodiments of the present disclosure, whether a person in the image is a child is achieved by a classification branch. The classification branch is trained based on sample images. Because different genders have different facial features, that is, during age identification, different results may be obtained for boys and girls of the same age. Therefore, in order to improve the classification accuracy of the classification branch, in the training of the classification branch, the sample image may be distinguished based on the gender of the child.

Optionally, before the performing face and/or body detection on at least one image frame in the video stream, the method further includes:

training the neural network by using a sample image, where the sample image has child annotation information.

Optionally, when the neural network includes a feature extraction branch, and a classification branch and at least one detection branch connected to the feature extraction branch, the sample image further includes detection annotation information in addition to the child annotation information. In this case, a first loss may be determined based on the prediction result of whether the passenger is a child obtained by the neural network, and the child annotation information. A second loss is determined according to detection prediction information obtained by the neural network and the detection annotation information. The neural network is trained by the first loss and the second loss. For example, the neural network is trained after weighting the first loss and the second loss.

Optionally, when the neural network includes a feature extraction branch and a classification branch, or a feature extraction branch and an identification branch, the sample image includes the child annotation information, and the sample image obtains a child classification prediction result by the neural network including the feature extraction branch and the classification branch. The network loss is determined based on the child classification prediction result and the child annotation information, and the neural network is trained. The sample image obtains an age prediction result by the neural network including the feature extraction branch and the identification branch. The prediction result of whether the passenger is a child is determined based on the age prediction result. The network loss is determined based on the prediction result of whether the passenger is a child, and the child annotation information, and the neural network is trained.

Optionally, the child annotation information indicates whether the person in the sample image is a child. In response to the fact that the age or estimated age of the person in the sample image is greater than the age or estimated age of a person in a reference image, the child annotation information of the sample image indicates a non-child. In response to the age or estimated age of the person in the sample image is less than or equal to the age or estimated age of the person in the reference image, the child annotation information of the sample image indicates a child.

Whether it is the age of a person estimated by manual judgment or network judgment, there may be errors. Therefore, the age of the person in the sample image may be the age obtained from the calculation of the date of birth, or the estimated age obtained according to manual judgment or network judgment. The person in the reference image may also adopt the age or the estimated age.

Because different people have different standards for determining a child, it may result in different annotation results for the same image by different people after annotation. Therefore, in the embodiments, the sample image is compared with the reference image to determine whether the person in the sample image is a child, which reduces the different judgment standards due to manual annotation, and improves the accuracy of child annotation information of the sample image, thereby improving the accuracy of training the network. Optionally, in this embodiment, determining whether the age or estimated age of the person in the sample image is greater than the age or estimated age of the person in the reference image is achieved manually or by the trained neural network.

Optionally, the reference image includes a boy reference image and a girl reference image.

Different genders have different judgment standards for children, and people's visual perceptions often differ greatly. Therefore, in order to reduce the error of annotation information due to gender differences, in the embodiments, a boy reference image and a girl reference image are respectively set for males and females, thereby improving the reliability of the annotation information. Two different boy reference images and girl reference images are taken as standards, respectively. If the age or estimated age of the person in the image is greater than that of the person in the reference image, it is determined that the person is not a child. If the age or estimated age of the person in the image is less than that of the person in the reference image, it is determined that the person is a child. Whether an image is a child is determined by dividing into male and female, respectively, which reduces the noise of the child data set, and improves the accuracy of the child data set.

In one or more optional embodiments, operation 110 includes: collecting to obtain the video stream of the rear seat area based on at least one camera disposed inside the vehicle.

In order to determine the passenger state, inaccurate situations such as unclear images or changes in facial expressions may occur by taking a separate image as the basis of analysis. In order to improve the accuracy of state analysis, in the embodiments, images of the passengers in the vehicle are collected by the camera inside the vehicle to obtain a video stream, and the image is obtained from at least one image frame in the video stream, and the obtained image implements monitoring of the passenger state in the vehicle.

Optionally, the monitoring camera of the embodiments may be disposed in front of a vehicle seat. For example, one camera is provided for each vehicle seat, and images of the vehicle seats are respectively collected to achieve accurate position identification, or one or more cameras are disposed in front of all vehicle seats to obtain images of the entire vehicle (the position of each vehicle seat needs to be preset) so as to identify the passenger on each seat.

In one or more optional embodiments, operation 140 includes:

in response to the fact that the state information of the passenger satisfies the predetermined condition, outputting prompt information to a device within the driver's line of sight range and/or a preset device.

Optionally, the prompt information may include at least one type of prompt information. When the information is displayed by a device within the driver's line of sight range, the driver or other members of the vehicle may promptly check the situation in the vehicle. The preset device may include a set guardian's mobile phone, a driver's mobile phone, an alarm device, and other terminal devices, etc. The preset device may monitor the situation inside the vehicle at other locations outside the vehicle. For example, when the driver temporarily leaves the vehicle, the driver may check the state of passengers, especially the children, in the vehicle by a terminal device (such as a mobile phone). Once the prompt information is received, the driver may return to the vehicle in time to cope with the unexpected situation. For example, in the highway rest area, if you want to go to the toilet, but worry about the situation of the child in the vehicle, you may enable the smart rear-seat monitoring function by the mobile phone APP.

In one or more optional embodiments, the method of the embodiments of the present disclosure further includes:

displaying, by the device within the driver's line of sight range and/or the preset device, at least one of information: at least one image frame of the obtained video stream or the detection result.

In addition to the prompt information, the devices within the driver's line of sight range and/or the preset devices may also display at least one image frame of the obtained video stream, detection results, and other information, and the driver or other personnel may analyze and obtain the information to obtain required information, so as to understand passenger state.

In one or more optional embodiments, before obtaining the video stream of the rear seat area in the vehicle, the method of the embodiments of the present disclosure further includes:

receiving, by a mobile application terminal or a vehicle-mounted device, a monitoring instruction.

Obtaining the video stream of the rear seat area in the vehicle includes: obtaining the video stream of the rear seat area in the vehicle according to the monitoring instruction.

Optionally, the mobile application terminal in the embodiments may be a preset device in the foregoing embodiment. That is, a monitoring instruction is received by the preset device, and then prompt information, and/or at least one image frame of the collected video stream, and/or detection results, etc. is received by the preset device, so that the monitoring information is fed back to the requester. The mobile application terminal may include a device such as a mobile phone and a tablet computer. The vehicle-mounted device in the embodiments may be the device within the driver's line of sight range that receives the feedback described above, so that the monitoring information is fed back to the driver at the request of the driver, or the vehicle-mounted device is a vehicle-mounted device (a touch display, etc.) at another passenger's location, so that the monitoring information is fed back to the driver according to the requests of other passengers.

Figure 6:
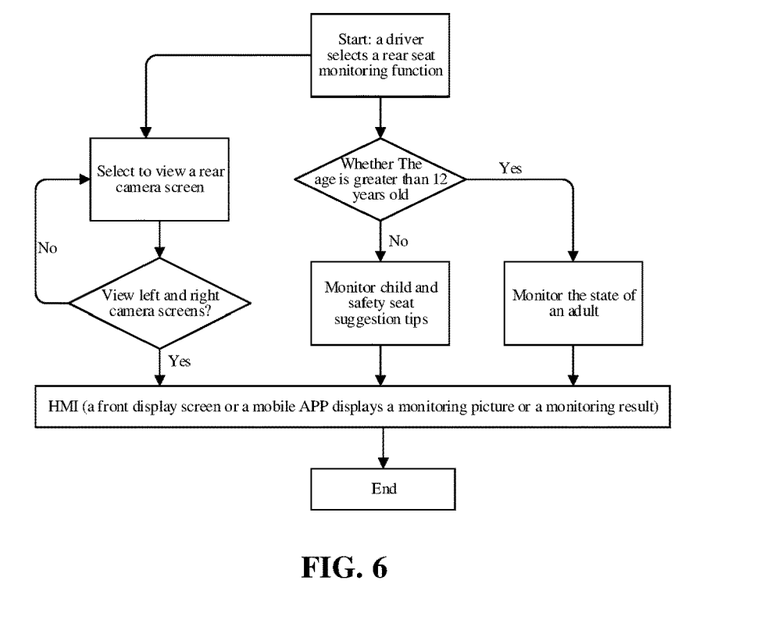
FIG. 6 is a schematic flowchart of yet another optional example of the passenger state analysis method according to embodiments of the present disclosure.

FIG. 6 is a schematic flowchart of yet another optional example of the passenger state analysis method according to embodiments of the present disclosure. As shown in FIG. 6, in the examples of the embodiments, the mobile application terminal receiving the monitoring instruction is selected as a mobile phone APP, or the vehicle-mounted device is selected as a front Human Machine Interface (HMI) touch screen. The rear-seat monitoring function is enabled by the HMI touch screen or the mobile phone APP, and then whether to view the monitoring picture or not may be selected. After the rear-seat monitoring function is enabled, a software system determines whether the age of the current person in the rear seat is greater than the set age (such as 12 years old) by using the video data transmitted from a camera. If the age is less than the set age, the child state monitoring and child seat suggestion tips are performed. If the child is not sitting on the child seat, it is prompted to suggest sitting in the child seat. If the child seat is already seated, whether the child is asleep, whether the child cries, whether the child is awake, whether the child leaves the child seat are monitored and alarmed (feedback to the front HMI or mobile APP). For adult state monitoring, when the age is greater than the set age, the front HMI or mobile APP displays the adult's age, gender and other monitoring information.

A person of ordinary skill in the art may understand that all or some operations for implementing the foregoing method embodiments are achieved by a program by instructing related hardware; the foregoing program can be stored in a computer-readable storage medium; when the program is executed, operations including the foregoing method embodiments are executed. Moreover, the foregoing storage medium includes various media capable of storing program codes, such as a Read Only Memory (ROM), a Random Access Memory (RAM), a magnetic disk, or an optical disk.

Figure 7:
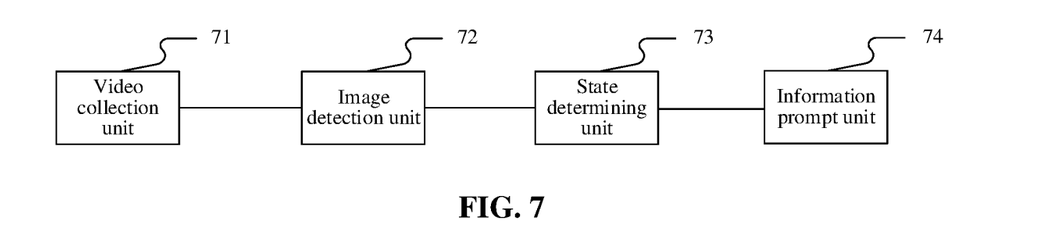
FIG. 7 is a schematic structural diagram of a passenger state analysis apparatus according to embodiments of the present disclosure.

FIG. 7 is a schematic structural diagram of a passenger state analysis apparatus according to embodiments of the present disclosure. The apparatus of this embodiment is used for implementing the foregoing method embodiments of the present disclosure. As shown in FIG. 7, the apparatus of the embodiments includes:

a video collection unit 71, configured to obtain a video stream of a rear seat area in a vehicle;

an image detection unit 72, configured to perform face and/or body detection on at least one image frame in the video stream;

a state determining unit 73, configured to determine state information of a passenger in the rear seat area according to a face and/or body detection result; and an information prompt unit 74, configured to: in response to the fact that the state information of the passenger satisfies a predetermined condition, output prompt information to a driver area or a specified device in the vehicle.

Based on the passenger state analysis apparatus provided in the embodiments of the present disclosure, a video stream of a rear seat area in a vehicle is obtained; face and/or body detection is performed on at least one image frame in the video stream; state information of a passenger in the rear seat area is determined according to a face and/or body detection result; and in response to the fact that the state information of the passenger satisfies a predetermined condition, prompt information is output to a driver area or a specified device in the vehicle. By analyzing the state of passengers and combining prompt information, the occurrence of accidents is reduced, and the safety and comfort of passengers are improved. Because the rear seat area is outside the driver's line of sight range, the state analysis of the person in this area may promptly inform the driver of the effective information or the information that the driver cares about, so that the driver concentrates on driving under normal circumstances to reduce distracted driving factors and improve driving safety. In addition, abnormal information or information that the driver is concerned about may be found in time, so that the driver takes timely measures to improve the user experience.

In one or more optional embodiments, the state determining unit 73 is configured to determine whether the passenger is in an abnormal state and/or whether the passenger makes a dangerous action according to the face and/or body detection result.

The information prompt unit 74 is configured to: in response to the fact that the passenger is in the abnormal state, the passenger makes the dangerous action, the passenger is in the abnormal state for a preset period of time, or the passenger is in the dangerous action state for a preset period of time, output the prompt information to the driver area or the specified device in the vehicle.

In the embodiments of the present disclosure, different abnormal states and dangerous actions of passengers have different urgencies. Once some abnormal states and dangerous actions occur, it needs to deal with immediately, otherwise more serious consequences may occur. For example, the passenger is in a choking state, if it is not handled in time, the life safety of the passenger is endangered, and thus it needs to be handled in time, or the passenger extends a part of the body out of the window, the vehicle may be staggered with other vehicles at any time in motion, causing danger to the passenger, and thus the dangerous action of the passenger needs to be stopped in time. Moreover, some abnormal states and dangerous actions are not urgent, and thus may be handled after a certain period of time.

Optionally, the abnormal state may include, but is not limited to, at least one of: irritability, vomiting, choking, coughing, pain, crying, falling asleep, or waking up.

Optionally, the dangerous action may include, but is not limited to, at least one of: opening a door, holding a device, unfastening a seat belt, extending a part of a body out of a window, leaving a specified area, or smoking, etc.

Optionally, the passenger includes at least one of: an adult or a child.

Optionally, the face and/or body detection result includes at least one of: whether there is a face, whether there is a body, eyes open, eyes closed, expression, age, mouth open, mouth closed, or body movements.

In one or more optional embodiments, the passenger includes the child. The rear seat area includes a child seat area. The face and/or body detection result includes at least one of: whether there is a face or whether there is a body.

The state determining unit 73 is configured to determine whether the child is located on the child seat according to the face and/or body detection result.

The information prompt unit 74 is configured to: in response to the fact that the child leaves the child seat or the childless state on the child seat exceeds a preset period of time, output prompt information to the driver area or the specified device in the vehicle.

In order to improve the safety of children, the child seat is usually fixed on the vehicle seat. After the child seat is fixed, the position of the child seat is determined. The child leaves the child seat or the childless state on the child seat exceeds a preset period of time, it is indicated that the child does not sit on the child seat, it is very dangerous for a child not to sit on the child seat when the vehicle is traveling, and it is necessary to arrange the child according to the prompt information provided in the embodiments of the present disclosure to improve the riding safety of the child.

In one or more optional embodiments, the passenger includes the child.

The state determining unit 73 is configured to determine whether the child is crying according to the face and/or body detection result.

The information prompt unit 74 is configured to: in response to the fact that the child is crying or the child is in a crying state for a preset period of time, output prompt information to the driver area or the specified device in the vehicle.

Because the child's emotional and physical conditions are unstable and may change at any time, when the child is in different states, reasonable operations are required to reduce the discomfort of the child or affect the driving safety. For example, when the child is in a crying state, it is needed to handle in time (e.g., pacifying the child in time, etc.) to reduce the abnormal state to harm the child.

In one or more optional embodiments, the passenger includes the child.

The face and/or body detection result includes eyes open and eyes closed.

The state determining unit 73 is configured to determine whether the child is asleep or awake according to a state statistical analysis result of the child's eyes open and/or closed within a predetermined time window.

The information prompt unit 74 is configured to: in response to the child being asleep, being asleep for a predetermined period of time, being awake, or being awake for a predetermined period of time, output the prompt information to the driver area or the specified device in the vehicle.

The state that the child is asleep or awake is a low-urgency situation. Prompt information may be sent promptly, or the prompt information may be sent when the child is asleep for a predetermined period of time, and the child is awake for a predetermined period of time, where the predetermined period of time corresponding to the asleep state and the predetermined period of time corresponding to the awake state may be the same or different.

In one or more optional embodiments, the face and/or body detection result includes: a classification result of whether the passenger is a child.

The image detection unit 72 is configured to extract a face and/or body feature of at least one image frame in the video stream, and perform classification processing of whether the passenger is a child based on the extracted feature.

In one or more optional embodiments, the image detection unit 72 is configured to perform face feature extraction and/or body feature extraction on the at least one image frame in the video stream by a feature extraction branch of a neural network, and determine the face and/or body detection result based on a face feature and/or a body feature extracted by the feature extraction branch by at least one detection branch connected to the feature extraction branch in the neural network.

In the embodiments of the present disclosure, face detection and body detection may be implemented by different detection branches, respectively. That is, the face detection result is obtained by one detection branch, the body detection result is obtained by another detection branch, and the face and body detection results are obtained by connecting at least one detection branch to the feature extraction branch to share the feature obtained by the feature extraction branch, which speeds up the detection process and saves detection time.

In one or more optional embodiments, the image detection unit 72 is configured to perform face feature extraction and/or body feature extraction on the at least one image frame in the video stream by the feature extraction branch of the neural network; and respectively determine whether a person in the image is a child, and the face and/or body detection result by a classification branch and at least one detection branch connected to the feature extraction branch in the neural network based on the face feature and/or the body feature extracted by the feature extraction branch.

In the embodiments of the present disclosure, the operation of determining whether the passenger is a child is added. Optionally, in the embodiments, the classification results (two classification results) of whether the passenger is a child are determined by inputting face features into the classification branch, i.e., determining that the passenger is a child or not a child. Sharing the face features and/or body features to determine whether the passenger is a child and the face and/or body detection result is merely one feature extraction process, which improves the detection and classification efficiency.

In one or more optional embodiments, the image detection unit 72 is configured to perform face feature extraction on the at least one image frame in the video stream by the feature extraction branch of the neural network; determine whether the person in the image is a child by the classification branch connected to the feature extraction branch in the neural network based on the face feature extracted by the feature extraction branch; or determine the age of the passenger in the image, and determine the passenger whose age is less than or equal to a preset age as a child by an identification branch connected to the feature extraction branch in the neural network.

In the embodiments of the present disclosure, one neural network is individually provided to determine whether the passenger is a child. Optionally, the classification result of whether the passenger is a child is determined by one classification branch based on the face feature, or the passenger's age is determined by the recognition branch based on the face feature, and the passenger with the age less than or equal to the preset age is determined as a child.

Optionally, the classification branch that determines whether the person in the image is a child is pre-trained based on child annotation data that distinguishes gender.

Optionally, the apparatus in the embodiments of the present disclosure further includes:

a network training unit, configured to train the neural network by using a sample image, where the sample image has child annotation information.

Optionally, the child annotation information indicates whether the person in the sample image is a child. In response to the fact that the age or estimated age of the person in the sample image is greater than the age or estimated age of a person in a reference image, the child annotation information of the sample image indicates a non-child. In response to the age or estimated age of the person in the sample image is less than or equal to the age or estimated age of the person in the reference image, the child annotation information of the sample image indicates a child.

Optionally, the reference image includes a boy reference image and a girl reference image.

In one or more optional embodiments, the video collection unit 71 is configured to collect to obtain the video stream of the rear seat area based on at least one camera disposed inside the vehicle.

In order to determine the passenger state, inaccurate situations such as unclear images or changes in facial expressions may occur by taking a separate image as the basis of analysis. In order to improve the accuracy of state analysis, in the embodiments, images of the passengers in the vehicle are collected by the camera inside the vehicle to obtain a video stream, and the image is obtained from at least one image frame in the video stream, and the obtained image implements monitoring of the passenger state in the vehicle.

In one or more optional embodiments, the information prompt unit 74 is configured to: in response to the fact that the state information of the passenger satisfies a predetermined condition, output prompt information to a device within the driver's line of sight range and/or a preset device.

Optionally, the apparatus in the embodiments of the present disclosure further includes:

a display unit, configured to display, by the device within the driver's line of sight range and/or the preset device, at least one of information: at least one image frame of the obtained video stream or the detection result.

Optionally, the apparatus in the embodiments of the present disclosure further includes:

an instruction receiving unit, configured to receive a monitoring instruction by a vehicle-mounted device and/or a mobile application terminal.

The video collection unit is configured to obtain the video stream of the rear seat area in the vehicle according to the monitoring instruction.

The working process, the setting manner, and the corresponding technical effects of any of the embodiments of the passenger state analysis apparatus provided by the embodiments of the present disclosure may be referred to the specific descriptions of the corresponding method embodiments of the present disclosure, and details are not described again here due to space limitations.

According to another aspect of the embodiments of the present disclosure, provided is a vehicle, including the passenger state analysis apparatus according to any one of the embodiments above.

With the vehicle provided in the embodiments of the present disclosure, it is possible to monitor the passengers on the rear seats in the vehicle, overcome the disadvantages of the blind spot of the driver, and enable the driver or other relevant personnel to promptly respond to the emergency situation of the passenger, which reduces the occurrence of accidents, thereby improving the safety and comfort of passengers.

Persons skilled in the art should understand that if the mobile application terminal and the preset device in the passenger state analysis apparatus are not provided in the vehicle, the mobile application terminal and the preset device do not belong to the part of the vehicle set forth in the embodiments of the present disclosure.

In one or more optional embodiments, the vehicle is provided with at least one first camera that is configured to collect a video stream of a rear seat area in the vehicle.

The first camera in the embodiments of the present disclosure may be an independent camera or a camera on other vehicle devices (such as a vehicle-mounted tablet and a vehicle-mounted display screen), or other forms of camera in the prior art, as long as the video in the rear seat area is collected. The embodiments of the present disclosure do not limit the specific existence manner of the camera.

Optionally, the first camera is provided on one side of the back of a front seat facing the rear seat area and above a rear seat in the vehicle.

Providing the first camera on the side of the back of the front seat facing the rear seat area makes it easier for the first camera to obtain the rear seat area, and the camera is located above the rear seat. Providing the camera in the area may effectively collect images of passengers in the rear seats, reducing the problem of incapable of collecting valid images due to improper camera positions.

In one or more optional embodiments, the vehicle is provided with a vehicle-mounted device in an area of driver's line of sight, and the camera is communicationally connected to the vehicle-mounted device.

Optionally, the vehicle-mounted device may be provided within the driver's line of sight range during driving of the vehicle, such as a console area, an instrument area, and the top of the front windshield. The vehicle-mounted device should also be set so as not to block the driver's line of sight, without affecting safe driving, so that the driver may promptly understand the situation of passengers in the rear seats of the vehicle while driving the vehicle.

Optionally, the vehicle-mounted device is further configured to analyze the state information of the driver, and output prompt information when a state analysis result of the driver satisfies a predetermined condition of predetermined fatigue or distraction or dangerous driving.

The embodiments of the present disclosure may also obtain and analyze the driver's state information. The state information may include, but is not limited to: actions, face information, etc. When the state analysis result satisfies a predetermined fatigue or distraction or dangerous driving condition, prompt information is output to prevent the danger caused by fatigue or distraction driving. The predetermined conditions for determining the fatigue or distraction or dangerous driving include, but are not limited to, the existing common types of fatigue or distraction or dangerous driving. For example, when the state analysis result determines that the driver is on the phone, it is indicated that the driver is in a distracted driving state. When the state analysis result determines that the driver's eyes are closed for more than the set time or the driver yawns, it is indicated that the driver is in a fatigue driving state. When the state analysis result determines that the time for the driver holding the steering wheel with one hand exceeds the predetermined time, it is indicated that the driver is in a dangerous driving state. The above examples are provided only for easy understanding for persons skilled in the art, and are not intended to limit the present disclosure. Persons skilled in the art should understand that all other conditions of fatigue or distraction or dangerous driving fall within the scope of protection of the present disclosure.

The neural network in the embodiments of the present disclosure may be a multi-layer neural network (i.e., a deep neural network), where the neural network may be a multi-layer convolutional neural network, such as LeNet, AlexNet, GoogLeNet, VGG, ResNet and other arbitrary neural network models. Each neural network may use a neural network of the same type and structure, or a neural network of a different type and/or structure. The embodiments of the present disclosure do not limit the network.

According to yet another aspect of the embodiments of the present disclosure, provided is an electronic device, including a processor, where the processor includes the passenger state analysis apparatus according to any one of the embodiments above.

According to still another aspect of the embodiments of the present disclosure, provided is an electronic device, including a memory, configured to store executable instructions; and a processor, configured to communicate with the memory to execute the executable instructions so as to complete operations of the passenger state analysis method according to any one of the embodiments above.

According to still another aspect of the embodiments of the present disclosure, provided is a computer-readable storage medium, configured to store computer-readable instructions, where when the instructions are executed, operations of the passenger state analysis method according to any one of the embodiments above.

According to yet another aspect of the embodiments of the present disclosure, provided is a computer program product, including computer-readable codes, where when the computer-readable codes are run on a device, a processor in the device executes instructions for implementing the passenger state analysis method according to any one of the embodiments above.

Figure 8:
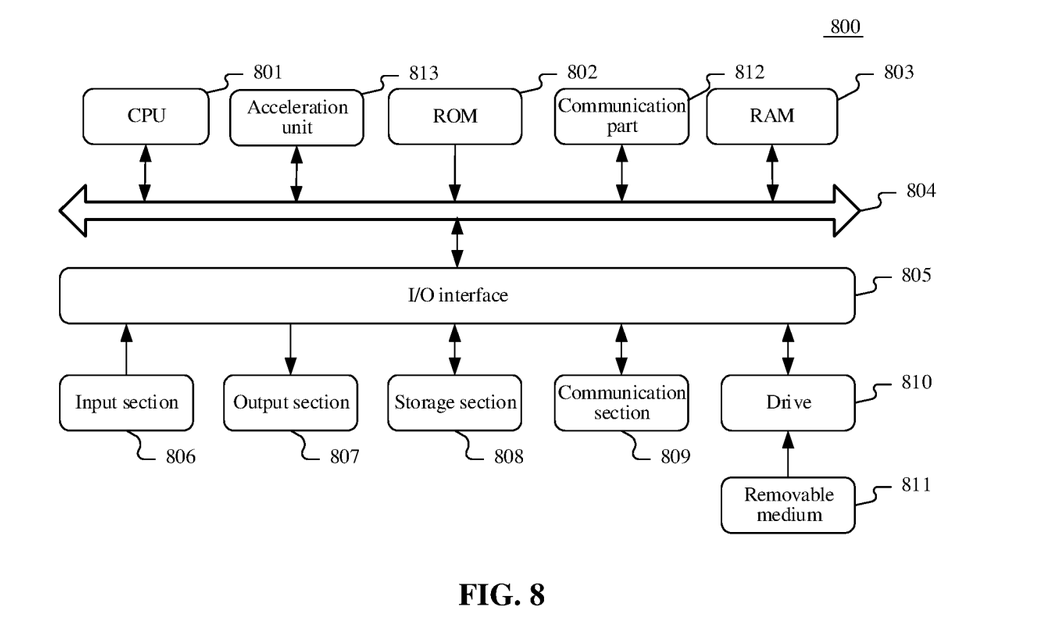
FIG. 8 is a schematic structural diagram of an electronic device for implementing a terminal device or a server according to embodiments of the present disclosure.

The embodiments of the present disclosure further provide an electronic device which, for example, may be a mobile terminal, a Personal Computer (PC), a tablet computer, a server, and the like. Referring to FIG. 8 below, illustrated is a schematic structural diagram of an electronic device 800, which may be a terminal device or a server, suitable for implementing the embodiments of the present disclosure. As shown in FIG. 8, the electronic device 800 includes one or more processors, a communication element, and the like. The one or more processors are, for example, one or more Central Processing Units (CPUs) 801 and/or one or more Graphic Processing Units (GPUs) 813, and the processor may execute appropriate actions and processing according to executable instructions stored in an ROM 802 or executable instructions loaded from a storage section 808 to an RAM 803. The communication part 812 may include, but is not limited to, a network card. The network card may include, but is not limited to, an Infiniband (IB) network card.

The processor is communicated with the ROM 802 and/or the RAM 803 to execute executable instructions, is connected to the communication part 812 by a bus 804, and is communicated with other target devices by the communication part 812, thereby completing operations corresponding to the methods provided by the embodiments of the present disclosure, e.g., obtaining a video stream of a rear seat area in a vehicle; performing face and/or body detection on at least one image frame in the video stream; determining state information of a passenger in the rear seat area according to a face and/or body detection result; and in response to the fact that the state information of the passenger satisfies a predetermined condition, outputting prompt information to a driver area or a specified device in the vehicle.

In addition, the RAM 803 may further store various programs and data required for operations of an apparatus. The CPU 801, the ROM 802, and the RAM 803 are connected to each other via the bus 804. In the case that the RAM 803 exists, the ROM 802 is an optional module. The RAM 803 stores executable instructions, or writes the executable instructions to the ROM 802 during running. The executable instructions cause the CPU 801 to execute corresponding operations of the foregoing communication method. An Input/Output (I/O) interface 805 is also connected to the bus 804. The communication part 812 is integrated, or is configured to have multiple sub-modules (for example, multiple IB network cards) connected to the bus.

The following components are connected to the I/O interface 805: an input section 806 including a keyboard, a mouse, and the like; an output section 807 including a Cathode-Ray Tube (CRT), a Liquid Crystal Display (LCD), a speaker, and the like; the storage section 808 including a hard disk and the like; and a communication section 809 of a network interface card including an LAN card, a modem, and the like. The communication section 809 performs communication processing via a network such as the Internet. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium is installed on the storage section 808 according to requirements.

It should be noted that the architecture shown in FIG. 8 is merely an optional implementation. During specific practice, the number and types of the components in FIG. 8 are selected, decreased, increased, or replaced according to actual requirements. Different functional components are separated or integrated or the like. For example, the acceleration unit 813 and the CPU 801 are separated, or the acceleration unit 813 is integrated on the CPU 801, and the communication part is separated from or integrated on the CPU 801 or the acceleration unit 813 or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product, which includes a computer program tangibly contained in a machine-readable medium. The computer program includes a program code for executing a method illustrated in the flowchart. The program code may include corresponding instructions for correspondingly executing the operations of the method provided by the embodiments of the present disclosure, e.g., obtaining a video stream of a rear seat area in a vehicle; performing face and/or body detection on at least one image frame in the video stream; determining state information of a passenger in the rear seat area according to a face and/or body detection result; and in response to the fact that the state information of the passenger satisfies a predetermined condition, outputting prompt information to a driver area or a specified device in the vehicle. In such embodiments, the computer program is downloaded and installed from the network by the communication section 809, and/or is installed from the removable medium 811. The computer program, when being executed by the CPU 801, executes the foregoing functions defined in the methods of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of operations of the method is merely for description, and unless otherwise stated particularly, is not intended to limit the operations of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A passenger state analysis method, comprising:
obtaining a video stream of a rear seat area in a vehicle;
performing face detection and body detection on at least one image frame in the video stream;
determining state information of a passenger in the rear seat area according to a result of the face detection and body detection; and
in response to the state information of the passenger satisfying a predetermined condition, outputting prompt information to a driver area or a specified device in the vehicle,
wherein the determining state information of the passenger in the rear seat area according to the result of the face detection and body detection comprises:
determining whether the passenger is in an abnormal state according to the result of the face detection and body detection; and determining whether the passenger makes a dangerous action according to the result of the face detection and body detection; and
the in response to the state information of the passenger satisfying the predetermined condition, outputting the prompt information to the driver area or the specified device in the vehicle comprises: in response to the passenger being in the abnormal state, the passenger making the dangerous action, the passenger being in the abnormal state for a preset period of time, or the passenger being in a dangerous action state for a preset period of time, outputting the prompt information to the driver area or the specified device in the vehicle,
wherein the abnormal state comprises at least one of: irritability, choking, coughing, or pain;
wherein the dangerous action comprises at least one of: opening a door, holding a device, unfastening a seat belt, extending a part of a body out of a window, leaving a specified area, or smoking;
wherein the passenger comprises a child;
wherein the result of the face detection and body detection comprises at least one of whether there is a face or whether there is a body;
wherein the rear seat area comprises a child seat;
the determining state information of the passenger in the rear seat area according to the result of the face detection and body detection further comprises: determining whether the child is located on the child seat according to the result of the face detection and body detection; and
the in response to the state information of the passenger satisfying the predetermined condition, outputting the prompt information to the driver area or the specified device in the vehicle further comprises: in response to a childless state on the child seat exceeding a preset period of time, outputting the prompt information to the driver area or the specified device in the vehicle.

2. The method according to claim 1, wherein
the determining state information of the passenger in the rear seat area according to the result of the face detection and body detection further comprises: determining whether the child is crying according to the result of the face detection and body detection; and
the in response to the state information of the passenger satisfying the predetermined condition, outputting the prompt information to the driver area or the specified device in the vehicle further comprises: in response to the child crying or the child being in a crying state for a preset period of time, outputting the prompt information to the driver area or the specified device in the vehicle.

3. The method according to claim 1, wherein
the result of the face detection and body detection further comprises eyes open and eyes closed;
the determining state information of the passenger in the rear seat area according to the result of the face detection and body detection further comprises: determining whether the child is asleep or awake according to a state statistical analysis result of the child's eyes open and/or closed within a predetermined time window; and
the in response to the state information of the passenger satisfying the predetermined condition, outputting the prompt information to the driver area or the specified device in the vehicle further comprises: in response to the child being asleep, being asleep for a predetermined period of time, being awake, or being awake for a predetermined period of time, outputting the prompt information to the driver area or the specified device in the vehicle.

4. The method according to claim 1, wherein the result of the face detection and body detection comprises: a classification result of whether the passenger is a child;
the performing face detection and body detection on at least one image frame in the video stream comprises:
extracting at least one of a face feature or body feature of the at least one image frame in the video stream; and
performing classification processing of whether the passenger is a child based on the extracted feature.

5. The method according to claim 1, wherein the performing face detection and body detection on at least one image frame in the video stream comprises: performing, by a feature extraction branch of a neural network, at least one of face feature extraction or body feature extraction on the at least one image frame in the video stream; and
determining, by at least one detection branch connected to the feature extraction branch in the neural network, the result of the face detection and body detection based on at least one of a face feature or a body feature extracted by the feature extraction branch.

6. The method according to claim 1, wherein the performing face detection and body detection on at least one image frame in the video stream comprises: performing, by a feature extraction branch of a neural network, at least one of face feature extraction or body feature extraction on the at least one image frame in the video stream; and
respectively determining, by a classification branch and at least one detection branch connected to the feature extraction branch in the neural network, whether a person in the at least one image frame is a child, and the result of the face detection and body detection based on at least one of a face feature or a body feature extracted by the feature extraction branch.

7. The method according to claim 1, wherein the performing face detection and body detection on at least one image frame in the video stream comprises: performing, by a feature extraction branch of a neural network, face feature extraction on the at least one image frame in the video stream;
determining, by a classification branch connected to the feature extraction branch in the neural network, whether a person in the at least one image frame is a child based on a face feature extracted by the feature extraction branch; or determining, by an identification branch connected to the feature extraction branch in the neural network, an age of the passenger in the at least one image frame, and determining the passenger whose age is less than or equal to a preset age as a child.

8. The method according to claim 6, wherein the classification branch that determines whether the person in the at least one image frame is a child is pre-trained based on child annotation data that distinguishes gender.

9. The method according to claim 6, before the performing face detection and body detection on at least one image frame in the video stream, further comprising:

training the neural network by using a sample image, wherein the sample image has child annotation information.

10. The method according to claim 9, wherein the child annotation information indicates whether the person in the sample image is a child; in response to an age or estimated age of the person in the sample image being greater than an age or estimated age of a person in a reference image, the child annotation information of the sample image indicates a non-child; and in response to the age or estimated age of the person in the sample image being less than or equal to the age or estimated age of the person in the reference image, the child annotation information of the sample image indicates a child.

11. The method according to claim 10, wherein the reference image comprises a boy reference image and a girl reference image.

12. The method according to claim 1, wherein the obtaining the video stream of the rear seat area in the vehicle comprises:

collecting to obtain the video stream of the rear seat area based on at least one camera disposed inside the vehicle.

13. The method according to claim 1, wherein the in response to the state information of the passenger satisfying the predetermined condition, outputting the prompt information to the driver area or the specified device in the vehicle further comprises:

in response to the state information of the passenger satisfying the predetermined condition, outputting the prompt information to at least one of a device within a driver's line of sight range or a preset device.

14. The method according to claim 13, further comprising:

displaying, by the at least one of a device within a driver's line of sight range or a preset device, at least one of the following information: at least one image frame of the obtained video stream or the result of the face detection and body detection.

15. The method according to claim 1, before the obtaining the video stream of the rear seat area in the vehicle, further comprising:

receiving, by a mobile application terminal or a vehicle-mounted device, a monitoring instruction; and the obtaining the video stream of the rear seat area in the vehicle comprises:

obtaining the video stream of the rear seat area in the vehicle according to the monitoring instruction.

16. An electronic device, comprising:

a memory, configured to store executable instructions; and a processor, configured to execute the executable instructions, when the executable instructions are executed, the processor is configured to:

obtain a video stream of a rear seat area in a vehicle;

perform face detection and body detection on at least one image frame in the video stream;

determine state information of a passenger in the rear seat area according to a result of the face detection and body detection; and in response to the state information of the passenger satisfying a predetermined condition, output prompt information to a driver area or a specified device in the vehicle, wherein the processor is further configured to:

determine whether the passenger is in an abnormal state according to the result of the face detection and body detection; and determine whether the passenger makes a dangerous action according to the result of the face detection and body detection; and in response to the passenger being in the abnormal state, the passenger making the dangerous action, the passenger being in the abnormal state for a preset period of time, or the passenger being in a dangerous action state for a preset period of time, output the prompt information to the driver area or the specified device in the vehicle, wherein the abnormal state comprises at least one of: irritability, choking, coughing, or pain;

wherein the dangerous action comprises at least one of: opening a door, holding a device, unfastening a seat belt, extending a part of a body out of a window, leaving a specified area, or smoking;

wherein the passenger comprises a child;

wherein the result of the face detection and body detection comprises at least one of whether there is a face or whether there is a body;

wherein the rear seat area comprises a child seat;

wherein the processor is further configured to:

determine whether the child is located on the child seat according to the result of the face detection and body detection; and in response to a childless state on the child seat exceeding a preset period of time, output the prompt information to the driver area or the specified device in the vehicle.

17. A non-transitory computer-readable storage medium, configured to store computer-readable instructions, wherein when the computer-readable instructions are executed by a processor, the processor is configured to perform the following operations:

obtaining a video stream of a rear seat area in a vehicle;

performing face detection and body detection on at least one image frame in the video stream;

determining state information of a passenger in the rear seat area according to a result of the face detection and body detection; and in response to the state information of the passenger satisfying a predetermined condition, outputting prompt information to a driver area or a specified device in the vehicle, wherein the determining state information of the passenger in the rear seat area according to the result of the face detection and body detection comprises:

determining whether the passenger is in an abnormal state according to the result of the face detection and body detection; and determining whether the passenger makes a dangerous action according to the result of the face detection and body detection; and the in response to the state information of the passenger satisfying the predetermined condition, outputting the prompt information to the driver area or the specified device in the vehicle comprises: in response to the passenger being in the abnormal state, the passenger making the dangerous action, the passenger being in the abnormal state for a preset period of time, or the passenger being in a dangerous action state for a preset period of time, outputting the prompt information to the driver area or the specified device in the vehicle, wherein the abnormal state comprises at least one of: irritability, choking, coughing, or pain;

wherein the dangerous action comprises at least one of: opening a door, holding a device, unfastening a seat belt, extending a part of a body out of a window, leaving a specified area, or smoking;

wherein the passenger comprises a child;

wherein the result of the face detection and body detection comprises at least one of whether there is a face or whether there is a body;

wherein the rear seat area comprises a child seat;

the determining state information of the passenger in the rear seat area according to the result of the face detection and body detection further comprises: determining whether the child is located on the child seat according to the result of the face detection and body detection; and the in response to the state information of the passenger satisfying the predetermined condition, outputting the prompt information to the driver area or the specified device in the vehicle further comprises: in response to a childless state on the child seat exceeding a preset period of time, outputting the prompt information to the driver area or the specified device in the vehicle.

\* \* \* \* \*